(12) United States Patent
Blessing et al.

(10) Patent No.: US 8,984,989 B2
(45) Date of Patent: Mar. 24, 2015

(54) CLUTCH ARRANGEMENT AND METHOD FOR ACTUATING SAME

(75) Inventors: Uli Christian Blessing, Heilbronn (DE); Guenter Ruehle, Loechgau (DE); Martin Seufert, Steinheim (DE)

(73) Assignee: GETRAG Getriebe-und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 194 days.

(21) Appl. No.: 13/604,567

(22) Filed: Sep. 5, 2012

(65) Prior Publication Data

US 2013/0055851 A1    Mar. 7, 2013

(30) Foreign Application Priority Data

Sep. 6, 2011 (DE) .......................... 10 2011 113 279

(51) Int. Cl.
*F16H 3/08* (2006.01)
*F16D 21/02* (2006.01)
*F16D 23/12* (2006.01)

(52) U.S. Cl.
CPC ................ *F16D 21/02* (2013.01); *F16D 23/12* (2013.01); *F16D 2300/14* (2013.01)
USPC ............................................ 74/664; 74/325

(58) Field of Classification Search
CPC ... F16D 13/70; F16D 2021/0684; B60K 6/48; B60K 7/0007
USPC .............. 74/325, 664; 192/48.7, 70.22, 70.27
See application file for complete search history.

(56) References Cited

U.S. PATENT DOCUMENTS

| 2,991,863 | A |   | 7/1961  | Glesmann et al. |
|-----------|---|---|---------|-----------------|
| 3,419,118 | A | * | 12/1968 | Allaben, Jr. ..................... 192/35 |
| 4,878,571 | A | * | 11/1989 | Sacher ........................ 192/48.91 |
| 8,109,376 | B2 | * | 2/2012 | Bek ............................. 192/70.22 |

FOREIGN PATENT DOCUMENTS

| DE | 199 17 724 A1 | 11/2000 |
| DE | 103 16 793 A1 | 5/2004 |
| DE | 10 2007 007 759 A1 | 5/2008 |
| DE | 10 2007 023 955 A1 | 11/2008 |
| EP | 1 400 715 A1 | 9/2002 |

OTHER PUBLICATIONS

European Search Report; Application No. EP 23 18 2918; Nov. 19, 2012.

* cited by examiner

*Primary Examiner* — Ha D Ho
(74) *Attorney, Agent, or Firm* — Knobbe Martens Olson & Bear, LLP

(57) ABSTRACT

Clutch arrangement for a motor vehicle drive train. The clutch arrangement has a first and a second clutch which are embodied as normally open clutches. The first clutch can be activated from an open position into a closed position by means of a first actuator arrangement. The second clutch can be activated from an open position into a closed position by means of a second actuator arrangement. The clutch arrangement has a locking device for locking a clutch in the closed position. Only the second clutch can be locked in the closed position by means of the locking device, while the first clutch cannot be locked in the closed position. Thus, the first actuator arrangement has to be supplied with energy in order to secure the first clutch in the closed position.

15 Claims, 3 Drawing Sheets

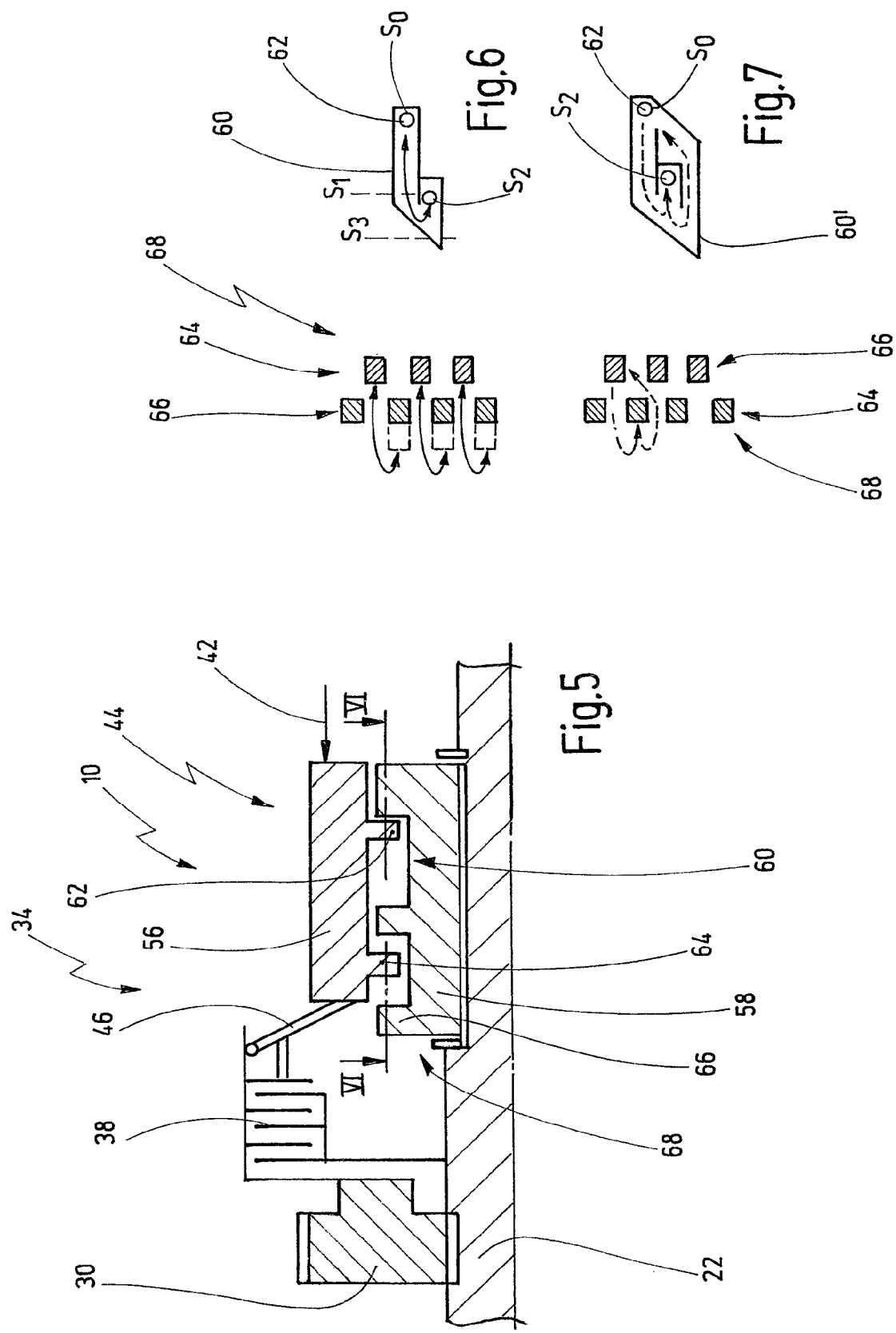

CLUTCH ARRANGEMENT AND METHOD FOR ACTUATING SAME

CROSS REFERENCE TO RELATED APPLICATIONS

This application claims priority of German Patent Application DE 10 2011 113 279, filed Sep. 6, 2011.

BACKGROUND OF THE INVENTION

The present invention relates to a clutch arrangement for a motor vehicle drive train, wherein the clutch arrangement has a first and a second clutch which are embodied as normally open clutches, wherein the first clutch can be activated from an open position into a closed position by means of a first actuator arrangement, and wherein the second clutch can be activated from an open position into a closed position by means of a second actuator arrangement, and wherein the clutch arrangement has a locking device for locking a clutch in the closed position.

A clutch arrangement of this type is known from document DE 199 17 724 A1. This document discloses a separate locking device for each of the two clutches, said locking devices being activated simultaneously in order to bring about a parking brake function so as to block the transmission in the stationary state.

In addition, document DE 10 2007 023 955 A1 discloses a friction clutch which can be secured by means of a mechanical securing device in a predefined position from which the clutch can be quickly activated.

Clutch arrangements of the type specified at the beginning can be used, for example, as clutch arrangements in double clutch transmissions, wherein the clutch arrangement is arranged between a drive engine and a step-by-step variable speed transmission having a plurality of gearspeeds, and wherein the step-by-step variable speed transmission has two component transmissions here. Each component transmission is assigned different gearspeeds, wherein as a rule one of the component transmissions is assigned the even-numbered gearspeed stages and the other component transmission is as a rule assigned the odd-numbered gearspeed changes.

In addition, a clutch arrangement of the specified type can also be used for a drive train in which the drive engine is formed by an electric motor and in which the transmission has only two gearspeed stages. In this context, the clutch arrangement serves either to shift the one gearspeed stage or the other gearspeed stage into the power flux to a differential of a driven axle.

The clutches are preferably embodied as friction clutches, in particular as wet-running multi-disk clutches. The friction clutches can, however, also be embodied as dry friction clutches.

In the two above-mentioned application cases, the two friction clutches can be activated in an overlapping fashion in order to be able to carry out a gearspeed change under load.

Friction clutches of this type are as a rule activated in an automated fashion by means of actuator arrangements. In this context, stringent safety requirements have to be met since simultaneous closing of both clutches can bring about blocking of the transmission and therefore blocking of a driven wheel.

Friction clutches of this type can either be embodied as normally closed or as normally open friction clutches. Normally closed friction clutches are generally pressed into the closed position, for example by means of a mechanical spring arrangement, and opened by means of the actuator arrangement. Normally open friction clutches are prestressed into an open position, for example by means of a mechanical spring arrangement, and are moved into the closed position by means of an actuator arrangement.

Normally open friction clutches are less problematic in technical safety terms for the reasons mentioned above. However, it is disadvantageous that the friction clutch which is respectively conducting power has to be kept continuously closed during operation of the clutch arrangement by means of the actuator arrangement (as a rule counter to a mechanical spring force), which leads to increased energy consumption.

SUMMARY OF THE INVENTION

Against this background, an objective of the invention is to specify an improved clutch arrangement for a motor vehicle drive train, a drive train with such a clutch arrangement and a method for actuating such a clutch arrangement, wherein technical safety requirements can be met relatively easily, and wherein nevertheless a high level of efficiency can be achieved during the operation of the clutch arrangement.

The above objective is achieved with the clutch arrangement mentioned at the beginning by virtue of the fact that only the second clutch can be locked in the closed position by means of the locking device, while the first clutch cannot be locked in the closed position, with the result that the first actuator arrangement has to be supplied with energy in order to secure the first clutch in the closed position.

In addition, the above objective is achieved by means of a drive train for a motor vehicle, wherein the drive train has a drive engine and a step-by-step variable speed transmission which has a plurality of gearspeed changes and a first and a second component transmission which, by means of a clutch arrangement of the type described above, can be shifted into the power flux and whose outputs are connected to a driven axle, wherein the first clutch can shift the first component transmission into the power flux, and wherein the second clutch can shift the second component transmission into the power flux, and wherein the clutches can be activated in an overlapping fashion in order to carry out a gearspeed change.

In addition, the above objective is achieved by means of a method for actuating a clutch arrangement, in particular a clutch arrangement of the type described above, wherein the clutch arrangement has a first and a second clutch which are embodied as normally open clutches, wherein the first clutch can be activated from an open position into a closed position by means of a first actuator arrangement, and wherein the second clutch can be activated from an open position into a closed position by means of a second actuator arrangement, and wherein only the second clutch can be locked in the closed position by means of a locking device, while the first clutch cannot be locked in the closed position, with the result that the first actuator arrangement has to be supplied with energy in order to secure the first clutch in the closed position.

In a drive train which is equipped with the clutch arrangement according to the invention, a driving mode in which the second clutch is closed is implemented basically without energy supply to the second actuator arrangement since the second clutch can be locked in the closed position in the driving mode.

Since, in contrast, the first clutch cannot be locked, technical safety requirements can be met more easily.

The two clutches are preferably embodied as friction clutches, in particular as wet-running multi-disk clutches. The friction clutches can, however, also be embodied as dry friction clutches.

The actuator arrangements can each be embodied as hydraulic actuator arrangements with a piston/cylinder arrangement. Alternatively to this, the actuator arrangements can also be embodied in an electromotive or electromagnetic fashion.

The locking device is preferably a mechanical locking device, wherein the locked position is a position in which the second clutch can transmit the maximum permissible torque. The locked position is preferably a self-securing position which is preferably secured by mechanical spring force during the locked state. In addition, the locked position can preferably be secured without having to supply energy to the second actuator arrangement.

Accordingly, a clutch arrangement can be implemented with a high level of efficiency. Technical safety aspects can relate substantially to the actuation of the first clutch, specifically as a function of the respective state of the second clutch (open, closed or in the locked position)

The second clutch can preferably be moved between the open position and a closed position in which the maximum torque can be transmitted, without bringing about the locked position. For this reason, power shifts with overlapping activation of the two clutches without using the locking function can be carried out without restriction.

The first and second clutches can be used, in particular, to connect two rotatable components, in particular to connect two shafts or to connect one shaft to an idler gear which is mounted on this shaft.

The object is therefore achieved completely.

It is particularly preferred in the clutch arrangement according to the invention if the locking device is arranged in the direction of action of the actuator force between the second actuator arrangement and the second clutch.

As a result, the locking device can act directly on the second clutch, even if the second actuator arrangement is not actuated.

It is particularly preferred here if a mechanical spring arrangement, such as for example a disk spring or annular spring, is arranged between the locking device and the second clutch.

The mechanical spring arrangement makes it possible to move the second clutch from the open to the closed position counter to the spring effect. On the other hand, as a result of the use of such a spring it is preferably also possible to move the actuator arrangement beyond the closed position, wherein the mechanical spring arrangement is elastically deformed. This function may be used, for example, to bring about the locking function.

In addition, the mechanical spring arrangement can also serve to prestress the second friction clutch generally into the open position, with the result that the second clutch is always opened if it is moved out of the locked position and if no actuator force is applied by the second actuator arrangement.

It is preferred here, in particular, if in order to bring about the closed position of the second clutch the second actuator arrangement can be moved from a first actuator position in a forward direction into a second actuator position, wherein the locking device is embodied in such a way that in order to lock the second clutch the second actuator arrangement moves in the forward direction beyond the second actuator position into a third actuator position.

In this third actuator position, the mechanical spring arrangement is preferably deformed elastically. The second clutch is closed here both in the second actuator position and in the third actuator position. In the third actuator position, the locked position can be brought about. However, the third actuator position preferably serves only as an intermediate position for bringing about the locked position.

It is particularly preferred here if the second actuator arrangement is pressed back, by means of a restoring spring, from the third position in a reverse direction into a fourth position in which the second actuator arrangement is secured with respect to a further reverse movement by means of a mechanical blocking device.

The fourth position is consequently the locked position in which the second clutch is closed and in which no force needs to be applied by the second actuator arrangement for this purpose.

The fourth position can be substantially equal to the second actuator position here, but is preferably arranged after the second actuator position when viewed in the forward direction of the actuator movement, and consequently between the second and the third actuator positions.

In this embodiment it is also advantageous if in order to release the locking of the second clutch the second actuator arrangement is firstly moved, again, in the forward direction.

In this context, the locking is released by the second actuator arrangement being moved in turn in the forward direction, with the result that release of the mechanical blocking device is simplified.

As an alternative to the above embodiment, the locking device can also easily bring about a locked position (for example by means of a spring-prestressed pin which presses into a groove of a pressure part of the locking device), from which position it is also possible to return (in the reverse direction) without firstly again applying a movement in the forward direction.

In the drive train according to the invention it is advantageous if the second component transmission, to which the second clutch is assigned, has that gearspeed stage which is used most frequently in the driving mode of the vehicle.

As a result, the locking device can be used for a large proportion of the driving mode, with the result that a high level of efficiency of the drive train can be achieved.

It is of particular advantage here if the gearspeed stage which is used most frequently is the highest gearspeed stage.

In a motor vehicle with a double clutch transmission, the second clutch can consequently be assigned to that component transmission which has the highest gearspeed stage (consequently the seventh gearspeed stage in a seven gearspeed transmission and consequently the sixth gearspeed stage in a sixth gearspeed transmission, etc.).

It is particularly preferred if the drive engine is an electric motor, wherein each of the two component transmissions has precisely one forward gearspeed stage, and wherein the higher forward gearspeed stage is set by the second component transmission.

In such a drive train, which can be used, for example, for a pure electric vehicle or for a hybrid vehicle whose drive train is embodied as a range extender, the second gearspeed stage serves by far the greater part of the driving mode. The first gearspeed stage is used here as a rule exclusively for sporty accelerations or on large gradients.

For this reason, in this type of drive train a particularly high level of efficiency can be achieved by the clutch arrangement according to the invention.

In the method according to the invention it is advantageous if at least when the second clutch is locked in the closed position, the first clutch is monitored to determine whether the first clutch is moved or actuated in the closing direction, and wherein a technical safety measure is initiated if the first clutch is moved or actuated in the closing direction.

If the second clutch is in the locked position, for technical safety reasons the first clutch must not be closed since otherwise stressed states could arise in the drive train.

If it is consequently detected that the first clutch is moved or actuated in the closing direction, a technical safety measure can be initiated, such as, for example, a "reset" of a control unit or the like, which as a rule automatically leads to a situation in which the first actuator arrangement is no longer supplied with energy, with the result that the first clutch is opened automatically (owing to its characteristic as a "normally open" clutch).

In the method according to the invention it is also advantageous if the two clutches are activated in an overlapping fashion when a gearspeed change occurs.

As a result, gearspeed changes can be carried out under load without interruption in the tractive force.

It is advantageous here if it is monitored whether during the overlapping activation the second clutch is moved in the direction of the locked position by the first and second clutches owing to a fault, wherein a technical safety measure is initiated before the second clutch has been locked in the closed position.

In other words, it is monitored whether the second clutch is moved beyond the closed position, in other words whether the actuator arrangement is moved beyond the second actuator position into a third actuator position.

As soon as this is the case, it is in turn possible to initiate a technical safety measure which preferably includes the fact that a control unit experiences a "reset". As a result, the first clutch is opened and/or the second clutch is prevented from moving into the locked position.

It is of particular advantage here if the adjustment travel of the second clutch from a position in which the second clutch is closed (corresponding to the second actuator position) up to a position from which the second clutch can be pressed automatically into the locked position (corresponding to the third actuator position) or up to the locked position itself is made of such a length that the technical safety measure can be initiated during the corresponding adjustment time.

In this context, by taking into account the possible adjustment speeds of the second clutch when configuring the adjustment travel, the adjustment travel between these two positions can be selected such that in all cases a technical safety measure can be initiated before the second clutch moves automatically into the locked position.

This makes it possible to prevent the second clutch from closing incorrectly and moving into the locked position when overlapping activation of the two clutches occurs.

Of course, the features which are mentioned above and the features which are still to be explained below can be used not only in the respectively specified combination but also in other combinations or alone without departing from the scope of the present invention.

BRIEF DESCRIPTION OF THE DRAWINGS

Exemplary embodiments of the invention are illustrated in the drawing and will be explained in more detail in the following description. In the drawing:

FIG. 5 shows a schematic longitudinal sectional view through a clutch arrangement;

FIG. 6 shows a sectional view along the line VI-VI in FIG. 5;

FIG. 7 shows a view, comparable to FIG. 6, of an alternative embodiment; and

DETAILED DESCRIPTION OF THE INVENTION

Figure 1:
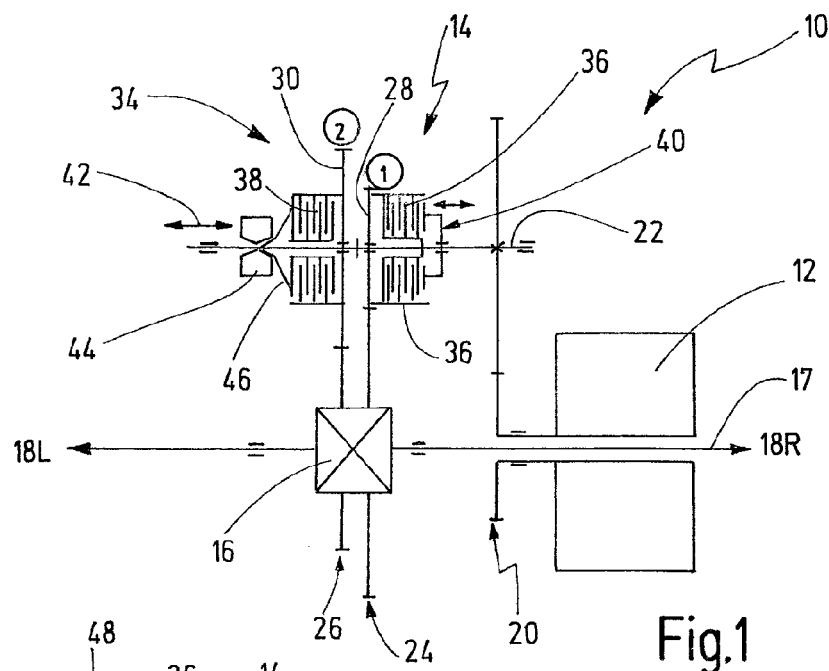
FIG. 1 shows a schematic illustration of a first embodiment of a drive train according to the invention.

A first embodiment of a drive train according to the invention is denoted generally by 10 in FIG. 1.

The drive train 10 includes a drive engine 12 in the form of an electric motor. In addition, the drive train 10 has a transmission 14 which is embodied here as a two-gearspeed transmission. The transmission 14 can be power shifted.

One output of the transmission is connected to a differential 16 which distributes drive power between two drive shafts 18L, 18R of a driven axle 17 of a motor vehicle. The differential 16 can be a mechanical differential (bevel gear differential etc.), but it may also be a differential which is formed by two friction clutches.

The motor 12 is arranged coaxially with respect to one of the drive shafts (here 18R) and has a motor shaft which is embodied as a hollow shaft. The motor shaft is arranged concentrically around the drive shaft 18R and is connected to an intermediate shaft 22 via a drive constant wheel set 20.

The intermediate shaft 22 forms an input shaft for the transmission 14. The transmission 14 has a first component transmission in the form of a first gearwheel set 24, and a second component transmission in the form of a second gearwheel set 26. The first gearwheel set 24 has a first idler gear, 28, which is rotatably mounted on the intermediate shaft 22. In a corresponding way, the second gearwheel set 26 has a second idler gear 30 which is rotatably mounted on the intermediate shaft 22. Fixed gears which engage with the idler gears 28, 30 are connected to an input element of the differential 16.

The drive train 10 also includes a clutch arrangement 34 with a first friction clutch 36 and a second friction clutch 38.

The first friction clutch 36 serves to shift the first gearwheel set 24 into the power flux. The second clutch 38 serves to shift the second gearwheel set 26 into the power flux. The clutches 36, 38 are each configured either to disconnect the idler gear 28, 30 assigned thereto from the intermediate shaft 22 or to connect said idler gear 28, 30 to said intermediate shaft 22.

The clutches 36, 38 are embodied as power shift clutches, in the present case as wet-running multi-disk clutches. The respective input elements of the clutches 36, 38 are fixedly connected to the intermediate shaft 22. The output elements of the clutches 36, 38 are connected to the respective idler gears 28, 30.

A first actuator arrangement 40 is used to activate the first clutch 36. A second actuator arrangement 42 is used to activate the second clutch 38. The actuator arrangements 40, 42 can be actuated independently of one another. In particular it is possible to activate the clutches in an overlapping fashion by means of the actuator arrangements 40, 42 in order in this way to be able to carry out gearspeed changes under load and without interrupting the tractive force.

The two clutches 36, 38 are each embodied as normally open clutches. That is to say the clutches 36, 38 are, for example, prestressed into their open position. Torques can be transmitted by the clutches only if energy is supplied to the respective actuator arrangements 40, 42 and an axial force is applied to the clutches 36, 38. If the actuator arrangements 40, 42 are switched to the de-energized state, the clutches 36, 38 as a rule open automatically. The second clutch 38 is assigned to the second gearspeed stage 2 of the transmission 14, and consequently to that gearspeed stage which is used predominantly in the driving mode of the motor vehicle.

In the present case, the second clutch 38 is assigned a locking device 44 which is schematically indicated in FIG. 1. This makes it possible to lock the second clutch 38 in a torque-transmitting position in such a way that the second actuator arrangement 42 can be switched to a de-energized state. The locking device 44 is preferably of self-securing design here.

As a result, in the driving mode, in which the second gearspeed stage 2 is mainly engaged, said gearspeed can be kept engaged by means of the locking device 44 without the assigned second actuator arrangement 42 having to be continuously supplied with energy.

On the other hand, the first clutch 36 does not have a locking device, with the result that when no energy is fed to the first actuator arrangement 40, the first clutch 36 always opens automatically.

To be more precise, the locking device 44 is provided between the second actuator arrangement 42 and the second clutch 38. In addition, a mechanical spring arrangement 46 is arranged between the locking device 44 and the second clutch 38. The spring arrangement 46 can be configured to prestress the second clutch 38 in the opening direction. In addition, the spring arrangement 46 is arranged and configured in such a way that the second actuator arrangement 42 can even be pressed further beyond a closed position of the second clutch 38 in order to bring about the locked position of the actuator arrangement 42 or of the second clutch 38, as is also described below.

Figure 2:
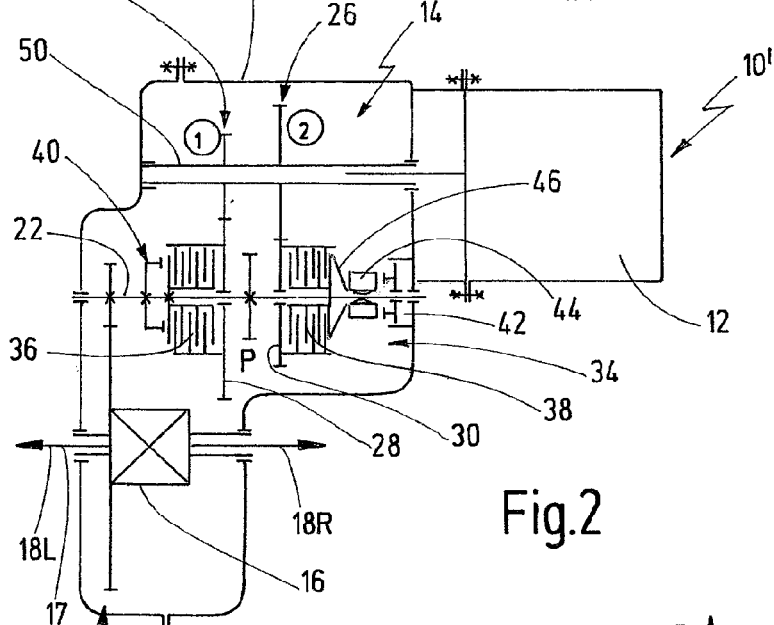
FIG. 2 shows a schematic illustration of a first embodiment of a drive train according to the invention.

FIG. 2 illustrates an alternative embodiment of a drive train 10'. The latter corresponds generally in terms of design and method of functioning to the drive train 10 in FIG. 1. Identical elements are therefore characterized by identical reference symbols. Basically the differences are explained below.

In the drive train 10, a drive engine 12 in the form of an electric motor is connected by flanges on the outside to a housing 48 of the transmission 14. In this context, a motor shaft extends into the transmission housing 48 and is connected in a rotationally fixed fashion to an input shaft 50 which is rotatably mounted in the transmission housing 48 and is embodied as a hollow shaft.

The two gear wheel sets 24, 26 each have a fixed wheel which is connected to the input shaft 50.

In addition, the intermediate shaft 22 is arranged parallel to the input shaft 50. The idler gears 28, 30 are rotatably mounted on the intermediate shaft 22. In a corresponding way, the two clutches 36, 38 are arranged concentrically with respect to the intermediate shaft 22 and can be activated by means of the actuator arrangements 40, 42.

A parking brake arrangement P is arranged on the intermediate shaft 22, between the two idler gears 28, 30.

In addition, at that end of the intermediate shaft 22 which faces away from the drive engine 12, an output constant wheel set 51 ("final drive") is arranged, which output constant wheel set 51 contains a fixed gear, connected to the intermediate shaft 22, and a gear which is connected to an input element of the differential 16.

The function of the drive train 10' is, apart from the modified transmission ratios, identical to that of the drive train 10 in FIG. 1.

Figures 3, 4:
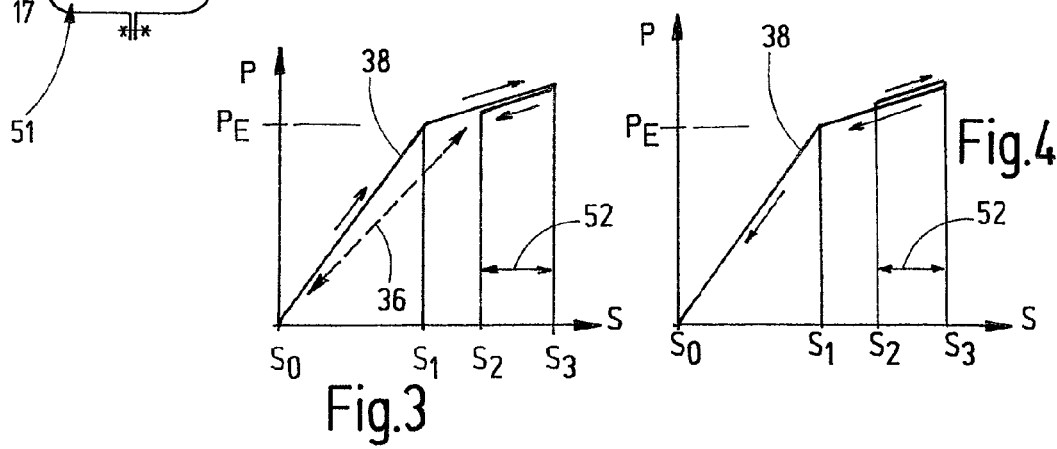
FIG. 3 shows a diagram of the pressure against the travel of a second actuator arrangement of the second clutch of a clutch arrangement according to the invention when the clutch closes and a locked position is brought about.
FIG. 4 shows a diagram, corresponding to FIG. 3, illustrating the moving out from a locked position.

FIG. 3 shows a diagram of the pressure P plotted against the travel s, in which diagram the characteristic curves of the first clutch 36 and of the second clutch 38 or of the assigned actuator arrangements 40, 42 are plotted. It is apparent that, starting from a travel $s_0$, in which the clutches are in the open position (P=0), the first clutch 36 can be moved as far as a travel $s_2$ (or as far as a travel $s_1$) at which a pressure $P_E$ prevails, at which the first clutch 36 is closed. The characteristic curve runs here essentially linearly and applies both to the opening and the closing of the first friction clutch 36.

The characteristic curve which is established for the second clutch 38 is shown in continuous lines and includes a linear section from the starting point $s_0$ to a first value $s_1$, from which the second clutch is closed and/or can transmit its maximum torque (closed position). In the case of power shifting with overlapping activation of the first clutch 36 and of the second clutch 38, the second clutch 38 is moved mainly within this characteristic curve section.

Insofar as it has been detected by means of a superordinate controller that the second gearspeed stage is to be permanently engaged, the second actuator arrangement 42 is moved in the forward direction beyond the travel $s_1$, specifically as far as $s_3$. The clutch is subsequently preferably pushed back automatically by the force of the spring arrangement 46, specifically into a position $s_2$, which is preferably located between the two positions $s_1$ and $s_3$. In this position, the second actuator arrangement 42 or the second clutch 38 is locked.

The distance from $s_2$ to $s_3$ is denoted as the excess pressure region 52.

In order to release the locking (FIG. 4), the second actuator arrangement 42 is in turn activated, with the result that the actuator arrangement 42 is moved back from the locked position $s_2$ into the excess pressure position $s_3$, from which the actuator arrangement 42 then firstly moves back into the position $s_1$ and then into the position $s_0$.

FIG. 5 is a schematic illustration of a detail of an exemplary embodiment of a clutch arrangement 34 of the drive train 10, wherein identical elements to the embodiment in FIG. 1 are provided with the same reference symbol.

The locking device 44 has a pressure part 56 which can move in the axial direction and which is arranged between the second actuator arrangement 42 and the spring arrangement 46.

The locking device 44 also includes a slotted-link part 58 which is mounted so as to be substantially non-displaceable in the axial direction on the intermediate shaft 22, but is rotationally movable with respect to the intermediate shaft 22.

The slotted-link part 58 has a slotted-link guide 60 into which a driver, such as a pin 62 of the pressure part 56, projects.

In addition, the pressure part 56 contains a first toothing 64 and the slotted-link part 58 contains a second toothing 66, which toothings 64, 66 can bring about mechanical blocking.

The mechanical blocking device 68 and the slotted-link guide 60 are illustrated in more detail in FIG. 6. The slotted-link guide 60 is approximately L-shaped in the plan view and contains a first guide duct within which the pin 62 can be moved from the position $s_0$ to the position $s_1$. The first guide duct is oriented axially. In addition, the slotted-link guide 60 contains a second guide duct within which the pin 62 can be moved from the position $s_3$ to the position $s_2$. The second guide duct is also oriented substantially axially. The two guide ducts are connected to one another by means of a substantially radially, preferably obliquely, oriented further guide duct, in order to move the guide pin from the position $s_1$ to the position $s_3$. In this context, the pressure part 56 and the slotted-link part 58 rotate.

The mechanical locking means 68 is embodied in such a way that when the pin 62 is displaced from $s_0$ to $s_1$, the first toothing 64 is guided axially through the second toothing 66. As a result of the relative rotation of $s_1$ to $s_3$, the first toothing 64 moves in alignment with the second toothing 66, with the result that in the position $s_2$ the first toothing 64 bears in the axial direction against the second toothing 66, as a result of which the locked position is brought about. This is illustrated by dashed lines on the left-hand side in FIG. 6. In this position, the second actuator arrangement 42 can be switched to the de-energized state, with the result that the first toothing 64 is pressed against the second toothing 66 by the spring arrangement 46. In order to release the locked position, the second actuator arrangement 42 is again deflected counter to the force of the spring arrangement 56, with the result that the pin 62 moves from the position $s_2$ to the position $s_3$, and can move from there to the position $s_1$ and $s_0$. For this purpose, the pressure part 56 and the slotted-link part 58 can be prestressed one against the other in the circumferential direction.

FIG. 7 illustrates an alternative embodiment of such a slotted-link guide at 60'. The slotted-link guide 60' is embodied as a heart-shaped slotted link and has a first guide section within which the pin 62 is guided from the position $s_0$ to the position $s_2$, as well as a second—separate—guide section within which the pin 62 is guided from the locked position $s_2$ back to the position $s_0$.

Figure 8:
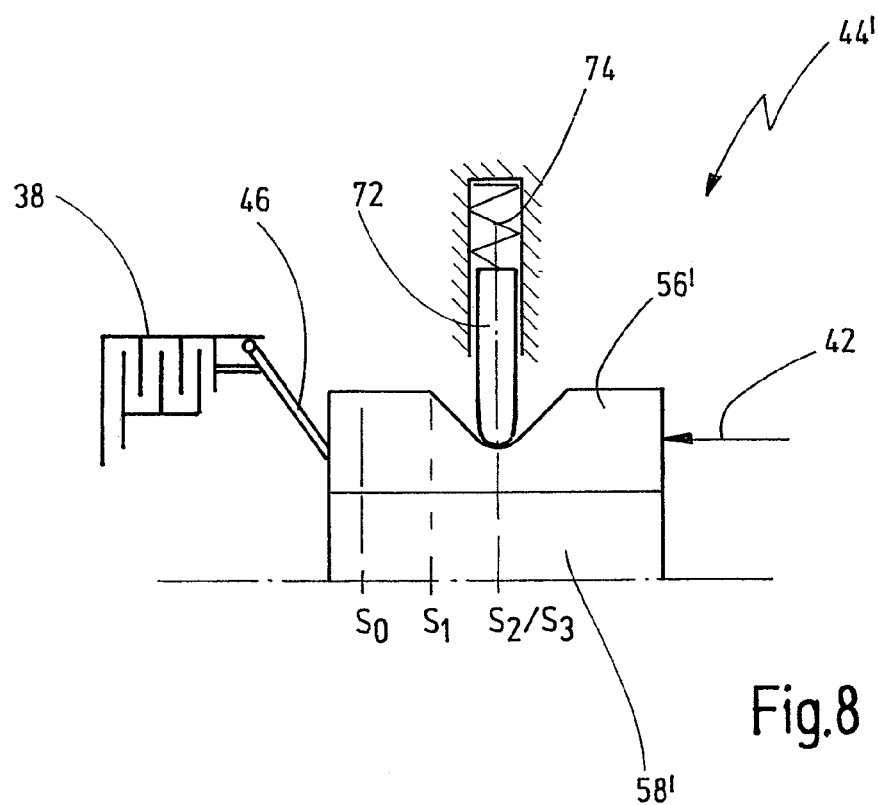
FIG. 8 shows an alternative embodiment of a locking device.

A further embodiment of a locking device 60' is shown in FIG. 8. In the case of this locking device 60', an actuator force of the second actuator arrangement 42 acts on a pressure part 56' which, as in the embodiments above, is coupled to the second clutch 38 via a spring arrangement.

The pressure part 56' is guided linearly on a guide part 58', but the latter does not necessarily have to have a slotted-link guide. On the outer circumference, the pressure part has a radial locking nut 70 into which a locking pin 72 can engage, said locking pin 72 being displaceably guided in the radial direction on a housing (not denoted in more detail). In this context, a locking spring 74 presses the locking pin 72 against the pressure part 56'.

In addition, the positions $s_0$, $s_1$, $s_2$ and $s_3$ are entered into FIG. 8, the functions of said positions corresponding to those of the above embodiments. Starting from $s_0$, the locked position is reached at the position $s_2/s_3$ via $s_1$ in the forward direction. This position can be reached without having to apply excess pressure, as is the case in the embodiment in FIGS. 5-7. Correspondingly, the locked position $s_2/s_3$ can be released without the need for preceding movement in the forward direction.

What is claimed is:

1. Clutch arrangement for a motor vehicle drive train, wherein the clutch arrangement has a first and a second clutch which are embodied as normally open clutches, wherein the first clutch can be activated from an open position into a closed position by means of a first actuator arrangement, and wherein the second clutch can be activated from an open position into a closed position by means of a second actuator arrangement, and wherein the clutch arrangement has a locking device for locking the second clutch in the closed position,
wherein the second clutch can be locked in the closed position by means of the locking device, while the first clutch cannot be locked in the closed position, such that the first actuator arrangement has to be supplied with energy in order to secure the first clutch in the closed position.

2. Clutch arrangement according to claim 1, wherein the locking device is arranged in the direction of action of the actuator force between the second actuator arrangement and the second clutch.

3. Clutch arrangement according to claim 2, wherein a mechanical spring arrangement is arranged between the locking device and the second clutch.

4. Clutch arrangement according to claim 1, wherein in order to bring about the closed position of the second clutch the second actuator arrangement can be moved from a first actuator position in a forward direction into a second actuator position, wherein the locking device is embodied in such a way that in order to lock the second clutch the second actuator arrangement moves in the forward direction beyond the second actuator position into a third actuator position.

5. Clutch arrangement according to claim 4, wherein the actuator arrangement is pressed back, by means of a restoring spring, from the third position in a reverse direction into a fourth position in which the second actuator arrangement is secured with respect to a further reverse movement by means of a mechanical blocking device.

6. Clutch arrangement according to claim 5, wherein the locking device is embodied in such a way that in order to release the locking of the second clutch the second actuator arrangement is firstly moved in the forward direction.

7. Drive train for a motor vehicle, wherein the drive train has a drive engine and a step-by-step variable speed transmission which has a plurality of gearspeed stages and a first and a second component transmission which, by means of a clutch arrangement, can be shifted into a power flux and whose outputs are connected to a driven axle, wherein the clutch arrangement has a first and a second clutch which are embodied as normally open clutches, wherein the first clutch can be activated from an open position into a closed position by means of a first actuator arrangement, and wherein the second clutch can be activated from an open position into a closed position by means of a second actuator arrangement, and wherein the clutch arrangement has a locking device for locking the second clutch in the closed position, wherein the second clutch can be locked in the closed position by means of the locking device, while the first clutch cannot be locked in the closed position, such that the first actuator arrangement has to be supplied with energy in order to secure the first clutch in the closed position, wherein the first clutch can shift the first component transmission into the power flux, and wherein the second clutch can shift the second component transmission into the power flux, and wherein the clutches can be activated in an overlapping fashion in order to carry out a gearspeed change.

8. Drive train according to claim 7, wherein the second component transmission, to which the second clutch is assigned, has that gearspeed stage which is used most frequently in the driving mode of the vehicle.

9. Drive train according to claim 8, wherein the gearspeed stage which is used most frequently is the highest gearspeed stage.

10. Drive train according to claim 7, wherein the drive engine is an electric motor, wherein each of the two component transmissions has precisely one forward gearspeed stage, and wherein the higher forward gearspeed stage is set by the second component transmission.

11. Method for actuating a clutch arrangement, wherein the clutch arrangement has a first and a second clutch which are embodied as normally open clutches, wherein the first clutch can be activated from an open position into a closed position by means of a first actuator arrangement, and wherein the second clutch can be activated from an open position into a closed position by means of a second actuator arrangement, and wherein only the second clutch can be locked in the closed position by means of a locking device, while the first clutch cannot be locked in the closed position, such that the first actuator arrangement has to be supplied with energy in order to secure the first clutch in the closed position.

12. Method according to claim 11, wherein at least when the second clutch is locked in the locked position, the first clutch is monitored to determine whether the first clutch is moved or actuated in the closing direction, and wherein a technical safety measure is initiated if the first clutch is moved or actuated in the closing direction.

13. Method according to claim 11, wherein the two clutches are activated in an overlapping fashion when a gearspeed change occurs.

14. Method according to claim 13, wherein it is monitored whether during the overlapping activation the second clutch is moved in the direction of the locked position by the first and second clutches owing to a fault, and wherein a technical safety measure is initiated before the second clutch has been locked in the closed position.

15. Method according to claim 14, wherein an adjustment travel of the second clutch from a position in which the second clutch is closed to a position from which the second clutch can be pressed automatically into the locked position or to the locked position, is made long enough that the technical safety measure can be initiated during a corresponding adjustment time.

* * * * *